(12) United States Patent
Maurel et al.

(10) Patent No.: US 11,753,140 B2
(45) Date of Patent: Sep. 12, 2023

(54) AIRCRAFT FUSELAGE PORTION COMPRISING MOVABLE OR DETACHABLE UNDER FLOOR STRUTS

(71) Applicant: Airbus Operations SAS, Toulouse (FR)

(72) Inventors: Jean-Luc Maurel, Toulouse (FR); Vincent Borrel, Toulouse (FR); Laurent Feuillerac, Toulouse (FR); Patrick Salgues, Toulouse (FR); Vincent Auriac, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 244 days.

(21) Appl. No.: 17/123,478

(22) Filed: Dec. 16, 2020

(65) Prior Publication Data

US 2021/0188417 A1 Jun. 24, 2021

(30) Foreign Application Priority Data

Dec. 18, 2019 (FR) ...................................... 1914714

(51) Int. Cl.
*B64C 1/18* (2006.01)
*B64C 1/40* (2006.01)

(52) U.S. Cl.
CPC ................ *B64C 1/18* (2013.01); *B64C 1/406* (2013.01)

(58) Field of Classification Search
CPC .................................. B64C 1/406; B64C 1/18
See application file for complete search history.

(56) References Cited

U.S. PATENT DOCUMENTS

2005/0242245 A1 11/2005 Balderama et al.
2009/0236472 A1* 9/2009 Wood ........................ B64C 1/18
244/119

(Continued)

FOREIGN PATENT DOCUMENTS

CA 2735078 A1 * 3/2010 ............. B64C 1/062
CN 108860563 A * 11/2018 ............. B64C 1/062

(Continued)

OTHER PUBLICATIONS

Translation of DE 102007036763 A1 (Year: 2007).*
French Search Report; priority document.

*Primary Examiner* — Joshua J Michener
*Assistant Examiner* — Ryan Andrew Yankey
(74) *Attorney, Agent, or Firm* — Greer, Burns & Crain, Ltd.

(57) ABSTRACT

An aircraft fuselage portion extending in a general longitudinal direction and comprising a fuselage structure comprising annular frames and a flat floor. The fuselage portion also comprises struts perpendicular to the floor in a nominal position and extending from the floor to a frame. Each strut comprises, in the vicinity of at least one of the ends thereof, a detachable link so that the strut can be moved relative to the fuselage structure or separated from the fuselage structure to temporarily grant access to a triangle area located between the frames, the floor and the struts in the nominal position. This allows access to be granted to the area in which the ducts must be installed in the aircraft, in particular, in the form of sets of ducts assembled prior to their installation in the fuselage.

11 Claims, 6 Drawing Sheets

(56) References Cited

U.S. PATENT DOCUMENTS

| | | | |
|---|---|---|---|
| 2010/0320327 A1* | 12/2010 | Sayilgan | B64C 1/406 244/131 |
| 2013/0092793 A1* | 4/2013 | Braeutigam | B64C 1/18 244/131 |
| 2015/0034764 A1* | 2/2015 | Fink | B64C 1/061 244/119 |
| 2015/0076198 A1 | 3/2015 | Koncz | |
| 2016/0129986 A1* | 5/2016 | Anast | B64C 1/069 244/119 |
| 2020/0056726 A1* | 2/2020 | Loss | B64D 41/00 |

FOREIGN PATENT DOCUMENTS

| | | | | |
|---|---|---|---|---|
| DE | 102007036763 A1 * | 2/2009 | | B64C 1/06 |
| DE | 102009029754 A1 | 12/2010 | | |
| DE | 102010014302 A1 | 10/2011 | | |
| DE | 102013215228 B3 | 12/2014 | | |
| EP | 2848518 A1 | 3/2015 | | |
| EP | 3018052 A1 | 5/2016 | | |

\* cited by examiner

AIRCRAFT FUSELAGE PORTION COMPRISING MOVABLE OR DETACHABLE UNDER FLOOR STRUTS

CROSS-REFERENCES TO RELATED APPLICATIONS

This application claims the benefit of the French patent application No. 1914714 filed on Dec. 18, 2019, the entire disclosures of which are incorporated herein by way of reference.

FIELD OF THE INVENTION

The present invention relates to the field of electric, hydraulic and pneumatic architectures for aircraft. It relates to the architecture of any type of aircraft, in particular commercial aircraft for transporting passengers and aircraft of the cargo type.

BACKGROUND OF THE INVENTION

The aircraft comprise, in a conventional configuration, an elongated fuselage, for example, of substantially cylindrical or double-bubble shape, based on a structure comprising a set of annular frames connected together by straight, longitudinal structural elements, called spars and stiffeners.

At least one floor is arranged inside the fuselage. The floor is substantially horizontal when the aircraft is on the ground. The floor is generally intended for the circulation of passengers and/or for the installation of the interior furnishings in a passenger transport aircraft, or to accommodate some of the cargo in a cargo airplane. The space above the floor where the passengers or any merchandise are located is called a "cabin", whereas the space under the floor comprises the hold of the aircraft, as well as various systems (landing gear, in their respective landing gear compartment, central area of the wing, etc.).

Most of the electric, hydraulic and pneumatic ducts of the aircraft are also arranged under the lowest floor of the aircraft, and, in particular, the main ducts that run longitudinally from the front to the rear of the fuselage to distribute the electricity or the relevant fluid to the consumers distributed throughout the aircraft. The longitudinal ducts are thus generally disposed in an area located immediately under the floor, on one side (or if applicable on each side) of the aircraft. Insofar as the floor is located in the vicinity of the horizontal diametral plane of the fuselage, or under this plane, the area for the passage of the ducts has a substantially triangular section. More specifically, this area has a substantially right-angled triangle section, the hypotenuse of which is curved (due to the cylindrical shape of the fuselage). The area for installing the ducts thus is sometimes called a "triangle area".

Although this area is particularly well suited for the installation of the longitudinal ducts due to its configuration, its position and due to the fact that it is difficult to use for other functions, this area is nevertheless difficult to access and is confined. This makes it more difficult to install the ducts, especially since they can only be fitted in the form of successive abutting portions. The abutment and the connection of the ducts are sometimes difficult to carry out, due to the compensation that is required for spaces due to the tolerances in the shape and the positioning of the ducts. Furthermore, the connectors between the various portions of abutting duct sometimes require clamping operations that are difficult to carry out due to the limited space available to complete the operations.

Therefore, the installation of the electric, hydraulic and pneumatic ducts is a complex, long and tedious operation for the operators.

The complexity involved in fitting and the poor working ergonomics in the area for installing the ducts makes assembly difficult, which is time-consuming and which generates costs.

SUMMARY OF THE INVENTION

The invention aims to overcome all or some of the aforementioned problems.

Thus, the invention relates to an aircraft fuselage portion extending in a general direction, called longitudinal direction, and comprising a fuselage structure comprising annular frames and a flat floor, the fuselage portion further comprising struts, which extend, in a nominal position perpendicular to the floor, from the floor to a frame. Each strut comprises a first end located close to a frame and a second end located close to the floor. Each strut comprises, in the vicinity of at least one of the first ends and the second ends, a detachable link so that the strut can be moved relative to the fuselage structure or separated from the fuselage structure in order to temporarily grant access to a space, called the triangle area, located between the frames, the floor and the struts in the nominal position.

The invention thus proposes a fuselage portion, in which the access to the triangle area is greatly facilitated by the use of pivoting struts capable of tilting from their nominal position to a position granting lateral access to the triangle area, or capable of being temporarily separated from the fuselage structure. The struts, thus, can assume a position that does not hinder the access to the triangle area, which allows ducts to be easily assembled in this area.

Advantageously, according to some embodiments, a set of ducts can be formed on a support, independent of its future installation site. According to various embodiments described hereafter, the fuselage structure can be adapted so that the set of ducts can be applied and fixed onto the struts before they are placed in their final vertical position, namely the nominal position.

According to one embodiment, each strut can comprise a pivot in the vicinity of the first end thereof and a detachable link in the vicinity of the second end thereof, so that the strut can be tilted from its nominal position to a position in a plane perpendicular to the longitudinal direction when the detachable link is released.

According to another embodiment, each strut can comprise a first detachable link in the vicinity of the first end thereof and a second detachable link in the vicinity of the second end thereof, so that the strut can be separated from the fuselage structure when the first and second detachable links are released.

Each strut can be connected, at the first end thereof, to a first part rigidly connected to a frame.

Each strut can be connected, in the vicinity of at least one detachable link, to a link part connected to the fuselage structure and comprising a first orifice, the strut comprising a second orifice aligned with the first orifice, with a detachable rigid link element, such as a pin, a bolt, or a stud, being placed in the first and second orifices so as to form the detachable link.

The fuselage portion can further comprise at least one set of ducts extending in the longitudinal direction, the set being installed in the triangle area, each duct being of the electric, hydraulic or pneumatic type.

The set of ducts comprises at least two ducts and it can comprise a duct support, with each duct being connected to the duct support.

The duct support can be fixed to a plurality of struts of the fuselage portion.

The duct support of the set of ducts can comprise a plurality of duct support elements distributed in the longitudinal direction following the spacing of the struts in the longitudinal direction.

The duct support for the set of ducts can comprise means adapted to translationally move on rails formed by the struts.

The set of ducts can comprise at least two ducts from among:
an air distribution duct for distributing air in a cabin and/or a cockpit;
a hydraulic duct for a hydraulic control system;
a water duct;
a suction duct.

The invention also relates to an aircraft comprising at least one fuselage portion as described above.

Finally, the invention relates to a method for assembling such an aircraft fuselage portion, comprising the following steps:
supplying a fuselage portion as described above (before the assembly of a set of ducts), the struts being separated from the fuselage structure or being in a position granting access to the triangle area;
forming a set of ducts comprising at least two ducts and a duct support, with each duct being connected to the duct support, the duct support being connected to, or at least partly formed by, a plurality of struts of the fuselage portion; positioning each strut in the nominal position thereof and immobilizing the struts in this position.

BRIEF DESCRIPTION OF THE DRAWINGS

Further features and advantages of the invention will become more clearly apparent in the following description, with reference to the accompanying drawings, which are provided by way of non-limiting examples.

DETAILED DESCRIPTION OF THE PREFERRED EMBODIMENTS

Figure 1:
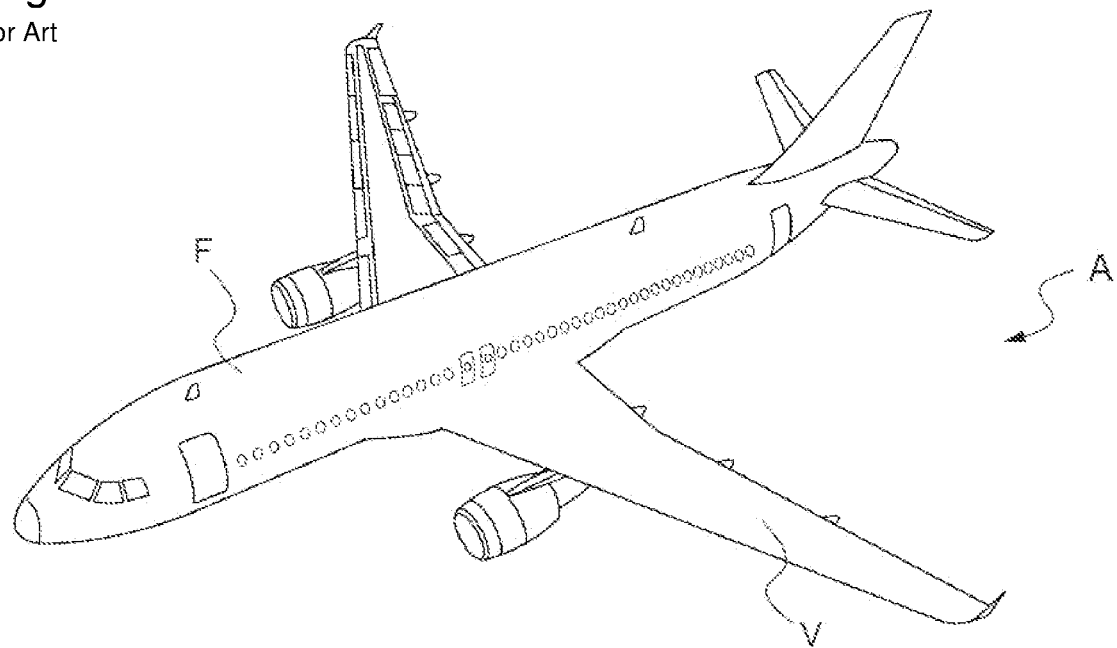
FIG. 1 shows a schematic three-dimensional view of a conventional example of a commercial aircraft.

FIG. 1 shows a commercial type aircraft A, for example, an aircraft for transporting passengers. Such an aircraft typically, and in a known manner, comprises a fuselage F having a general cylindrical shape, to which a wing V is attached for ensuring the lift of the aircraft.

Figure 2:
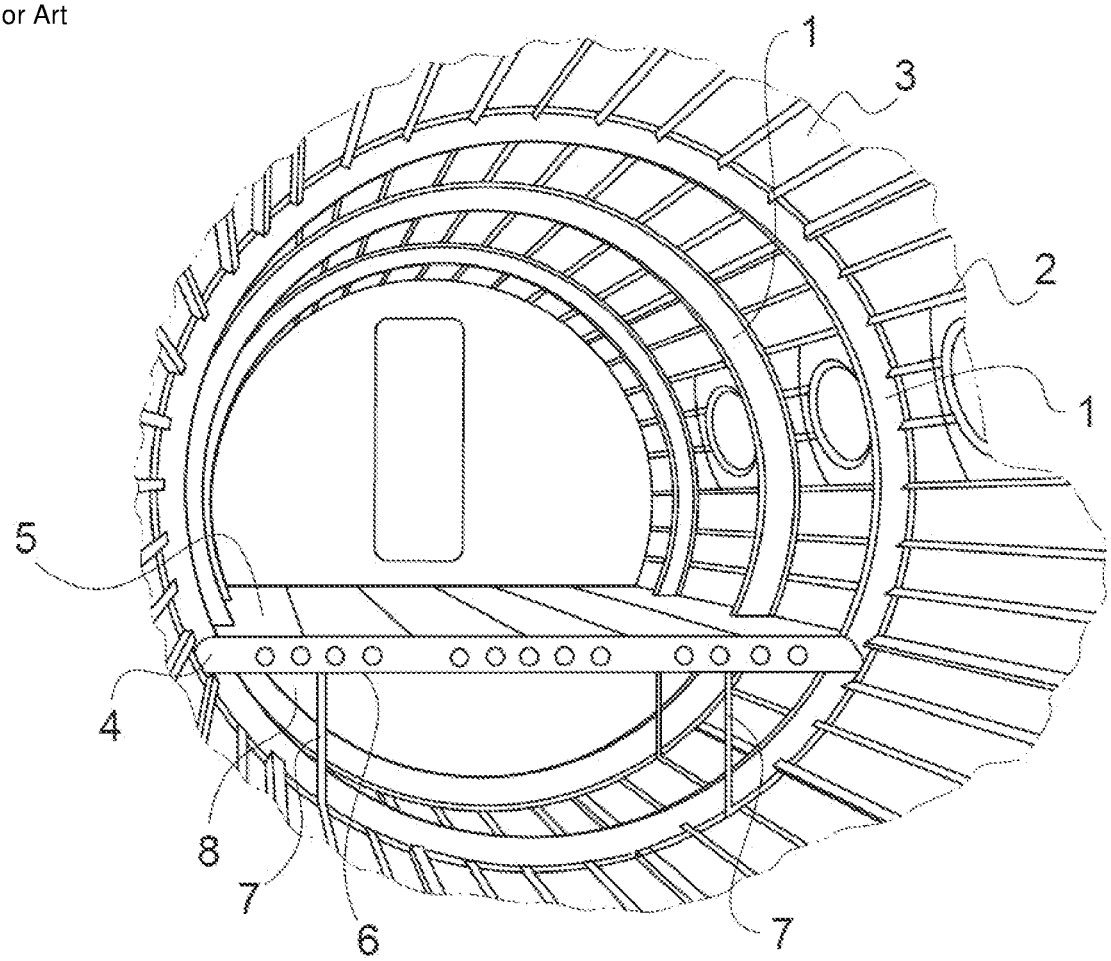
FIG. 2 shows a schematic three-dimensional view of an aircraft fuselage portion.

FIG. 2 is a highly schematic representation of an aircraft fuselage portion, and particularly illustrates the structure that it conventionally comprises. FIG. 2 thus proposes an internal view of an aircraft fuselage portion. The fuselage structure thus comprises annular frames 1, of general substantially circular shape. The frames 1 are connected together, in a direction called longitudinal extension direction of the fuselage, by spars 2 and longitudinal stiffeners. The frames 1 and spars 2 are fixed onto a skin 3 forming the outer surface of the fuselage. A floor 4 is installed in the fuselage portion. The floor 4 is substantially flat and horizontal when the aircraft comprising the fuselage portion is on the ground. It comprises an upper face 5, allowing, for example, passengers to circulate, furnishing equipment to be installed, etc. The volume located above the floor forms the cabin (and the cockpit) of the aircraft. The floor comprises a lower face 6 connected to the fuselage structure by vertical struts 7 (i.e., orthogonal to the floor 4, called horizontal floor).

The volume located inside the fuselage, under the floor, is used to accommodate a large number of devices of the aircraft. The central part can particularly comprise at least one part of the hold intended to accommodate luggage or other cargo, or, in other longitudinal areas of the aircraft, it can comprise the landing gear compartments.

On each side of the fuselage, under the floor, two lateral volumes are thus formed between the lower surface 6 of the floor, the frames 1 and the stiffeners or spars (and the skin 3), and the vertical plane, in which the struts 7 furthest away from the center of the fuselage are disposed. This area is called triangle area 8 due to its general shape. The triangle area 8 therefore provides a volume with a substantially triangular transverse section, longitudinally extending in the fuselage, and which thus proves to be well suited for accommodating longitudinal ducts, and, in particular, the main ducts that run longitudinally from the front to the rear of the fuselage to distribute electricity or fluids (including the vacuum in order to allow suction) to systems of the aircraft, which are generally denoted using the term "consumers" and which are distributed throughout the aircraft.

Figure 3:
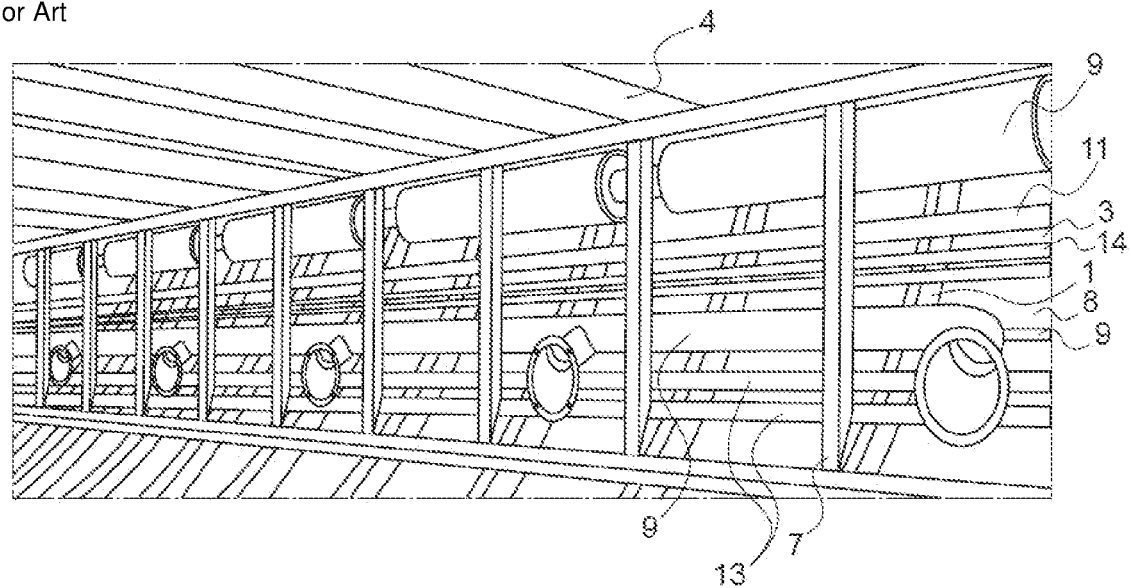
FIG. 3 shows a schematic three-dimensional view of a set of ducts installed in an aircraft fuselage portion according to the prior art.

An example of the installation of such ducts, in accordance with the known prior art, is shown in FIG. 3. FIG. 3 more particularly shows the triangle area 8 of an aircraft fuselage portion. In a modern aircraft, numerous ducts must be installed in the triangle area 8. In the example shown herein, the following ducts are installed in the triangle area:

a plurality of large air distribution ducts 9 are intended to distribute air in the cabin and, if applicable, in the cockpit (corresponding, for example, to the ventilation, to the air-conditioning, etc.);

one or more hydraulic ducts 14 (in this case shown in the form of a set of parallel ducts) also can be present (for activating hydraulic systems);

a suction duct (for the toilets) 11 also can be present. At least one water duct 13 (for routing water, for example, for the toilets) also can be provided.

Electric ducts (cables, which may or may not be in a harness, generally sheathed) also can be disposed in this area.

Due to the complexity involved in accessing the triangle area 8, which is clearly shown in FIG. 3, and particularly since this area is located in an area of the aircraft that is intrinsically difficult to access, and due to the struts 7, it is difficult to install the various ducts in the fuselage portion.

In particular, since for the most part rigid ducts are involved, each rigid duct needs to be installed in portions and the portions need to be connected in order to form the considered duct. The dimensional tolerances of the various duct portions can make them difficult to bring into abutment. Furthermore, the confinement of the triangle area makes it difficult to clamp the connectors. Each connector is a possible source of non-compliance and needs to be inspected after assembly. All this makes the installation of the ducts in the triangle area 8 complex, expensive and time-consuming.

Figure 4:
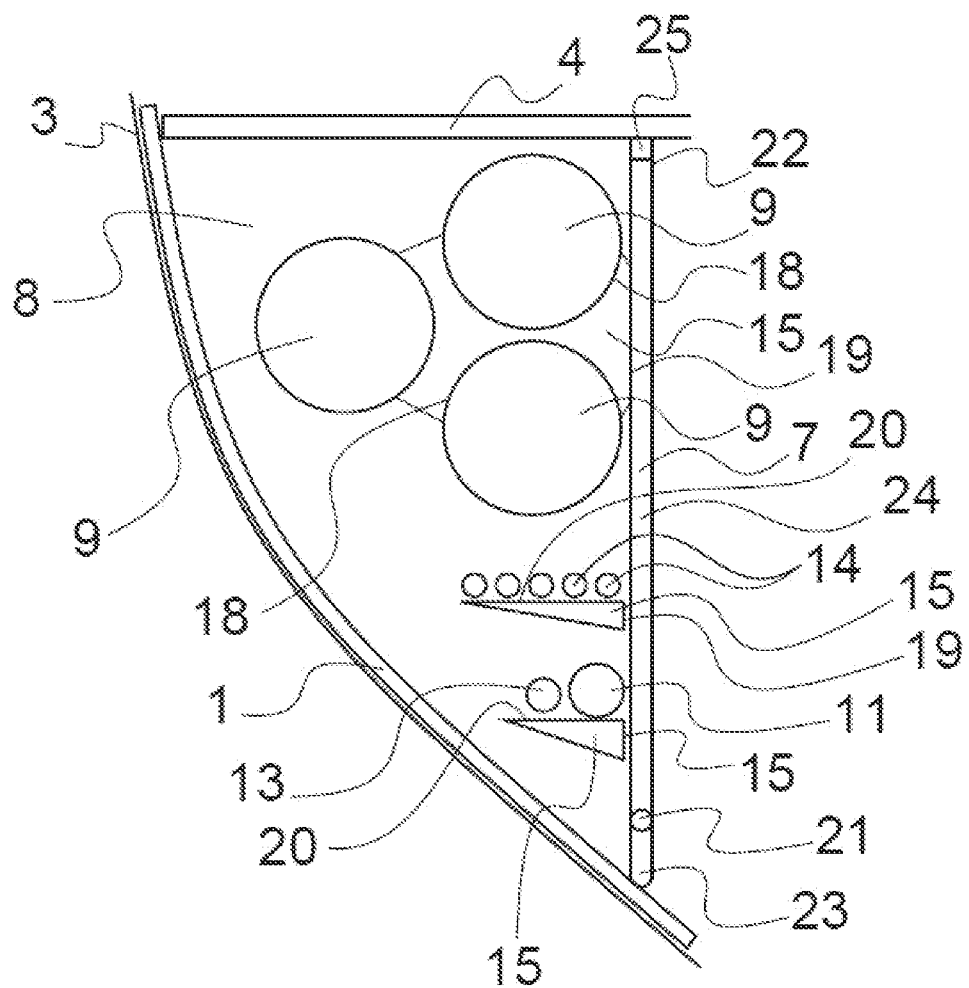
FIG. 4 shows a schematic two-dimensional view of an installation, in a fuselage portion according to a first embodiment of the invention, comprising sets of ducts installed in the triangle area of the fuselage portion.

FIG. 4 shows an installation comprising sets of ducts, according to one embodiment of the invention, installed in an aircraft fuselage structure.

The ducts installed in FIG. 4 correspond to the ducts previously described with reference to FIG. 3. In the illustrated embodiment, the ducts are consolidated into three sets of ducts, with each set comprising at least two ducts. Any other configuration can be contemplated.

In this case, a first set of ducts comprises an air distribution duct 9, including a hold ventilation duct and a heating duct.

A second set of ducts comprises a plurality of hydraulic ducts 14.

A third set of ducts comprises a suction duct 11 and a water duct 13.

Each set of ducts comprises, in the example shown, a duct support 15. The ducts of the same set are thus fixed to a duct support 15.

Figure 7:
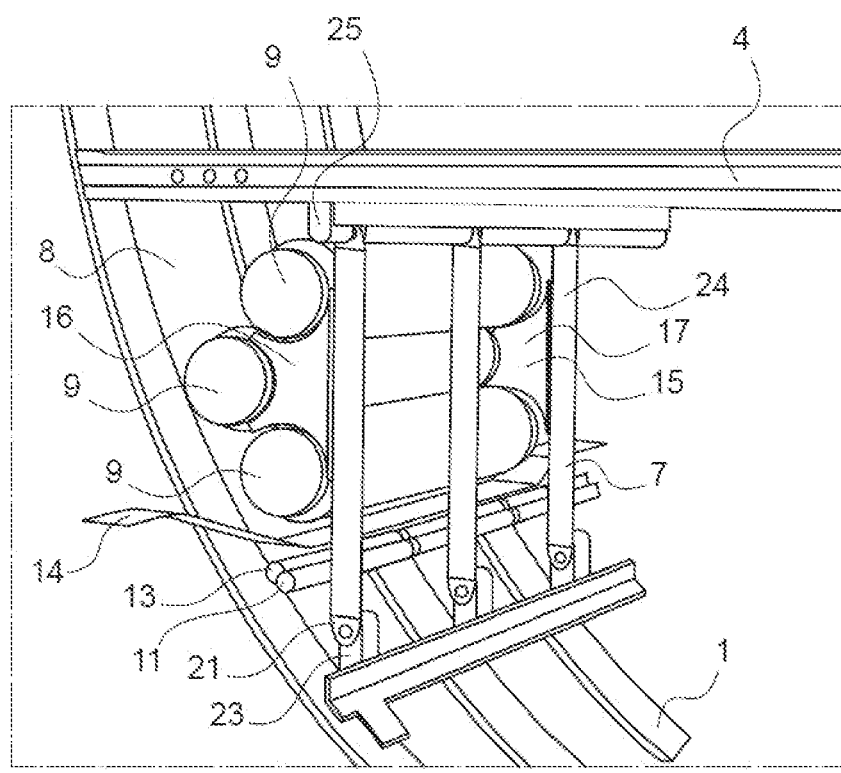
FIG. 7 shows a schematic three-dimensional view of the sets of ducts of FIG. 4 installed in an aircraft fuselage portion following a third installation step.

The duct support 15 can be formed by a rigid element extending in the direction of extension of the ducts or, preferably, can be formed by a plurality of duct support elements 16, 17, as in the example shown herein and as shown in FIG. 7.

The duct support 15 can assume various configurations, and particularly various transverse sections, in order to be adapted to the ducts to be supported.

In the example shown herein, the duct support 15 of the first set of ducts (and therefore each duct support element 16, 17 forming the set) has a plurality of surfaces 18 for accommodating circular cross sectioned ducts, with each accommodation surface 18 forming an arc of a circle with a diameter corresponding to that of the duct that it is intended to accommodate. The duct support 15 comprises a flat face 19, adapted to come into abutment and to be fixed on an external element perpendicular to the direction of extension of the ducts.

The duct support of the second set of ducts, like that of the third set of ducts, is shown in the form of a support bracket having a face 20 for accommodating the ducts and, like the duct support of the first set of ducts, a flat face 19 adapted to come into abutment and to be fixed on an external element perpendicular to the direction of extension of the ducts.

The general form of the fuselage portion shown in FIG. 4 is similar to that described with reference to FIG. 3, and thus comprises annular frames 1 connected together, in a longitudinal direction of extension of the fuselage, by spars 2 and longitudinal stiffeners. A skin 3 covers these elements.

A floor 4 is installed in the fuselage portion. The lower face 6 of the floor is connected to the fuselage structure by struts 7. A triangle area 8 is thus defined.

The fuselage portion has the particular feature that each strut 7 comprises, at a first end located close to a frame 1, a pivot 21 allowing the strut to tilt in a plane parallel to the longitudinal direction. In particular, the strut 7 can tilt along a pivot with a longitudinal axis, until it adopts a substantially horizontal configuration.

At the other end of the strut, called second end, close to the floor 4, each strut 7 comprises a detachable link 22. The detachable link 22 denotes a device that allows the strut to be fixed, to render it immobile, or released, to allow tilting along the pivot 21. Each strut thus can tilt or pivot from its vertical nominal position to a tilted position, for example, a horizontal position, in which the access to the triangle area is not hindered by the struts 7.

More specifically, in the preferred example shown, each strut 7 is connected, at the first end thereof, to a first part 23 rigidly connected to a frame 1 of the fuselage structure. A second part 24, which forms all or part of the strut 7, is pivotably connected to the first part 23.

Furthermore, each strut 7 is connected, at the second end thereof, to a link part 25. The link part 25 is rigidly connected to the floor and is detachably connected to the strut 7, in this case to the second part 24. The detachable link between the second part 24 of the strut 7 and the link part 25 can be produced in various manners. In particular, the link part 25 can comprise a first through-orifice and the strut 7 can comprise (in the second part 24) a second through-orifice that can be aligned with the first orifice. A detachable rigid link element, such as a pin, a bolt or a stud, then can be installed in the first and second aligned orifices. This immobilizes the second part 24 of the strut 7 relative to the link part 25, and thus prevents it from tilting about the pivot 21.

Figure 5:
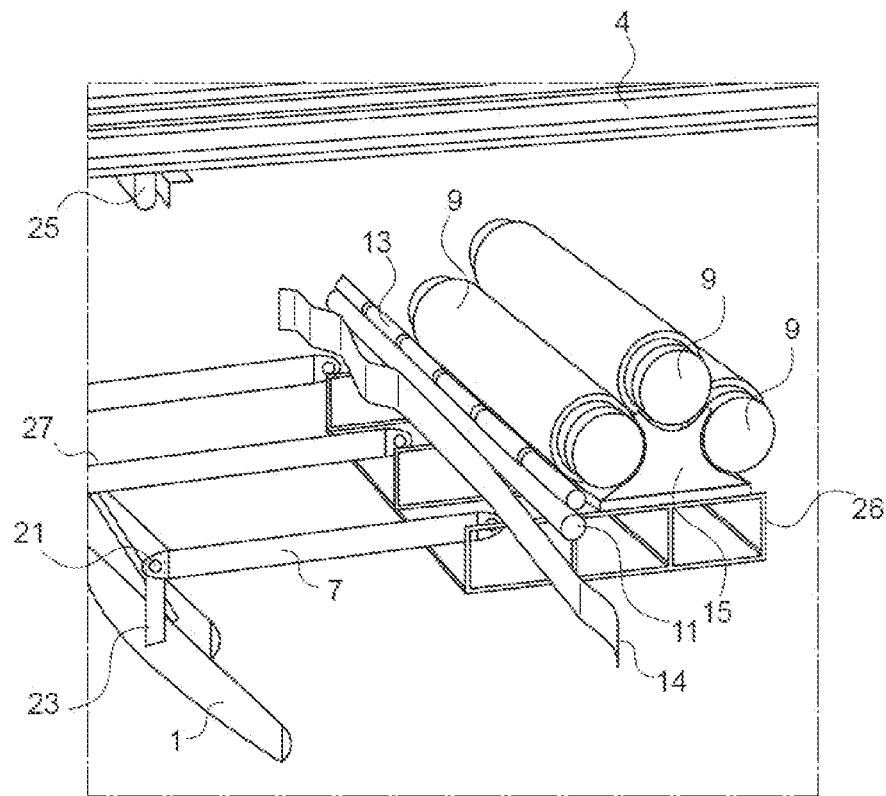
FIG. 5 shows a schematic three-dimensional view of the sets of ducts of FIG. 4 in a first step of installation in an aircraft fuselage portion.

FIG. 5 shows the sets of ducts of FIG. 4 in a first step of installation in an aircraft fuselage portion.

One of the advantages of the invention, which is shown in FIG. 5, is that the set of ducts (or each set of ducts) can be formed independent of its final installation environment, i.e., before its installation in a fuselage (or more generally an aircraft fuselage portion). The set of ducts particularly can be formed in a workshop independent of the final assembly workshop of the aircraft equipped with the set of ducts. The set of ducts can be formed on a suitable jig, giving the assembly operators the possibility of working without any accessibility constraints. Furthermore, once the set of ducts is formed, it is possible for it to be tested prior to installation in the fuselage, which ensures, if necessary, rapid and easy compliance, and especially avoids the assembly of a non-compliant set of ducts that would have to undergo repairs in the highly constrained environment of the fuselage.

The jig can assume the form of a carriage 26, which also can be used to transport the set of ducts (or the sets of ducts) from the workshop where it is formed to the fuselage portion where it must be installed.

In the installation step shown in FIG. 5, the sets of ducts described with reference to FIG. 4 have been formed and brought on a carriage 26 into an aircraft fuselage portion, opposite the area where they must be installed.

The struts 7 of the fuselage portion have been tilted about the pivot 21, in a substantially horizontal position, parallel to the floor 4. Each strut 7 can be temporarily fixed to the carriage 26 in the vicinity of the end thereof that is opposite the pivot 21, so as to form a continuous horizontal rail between the carriage and a surface of the strut 27 forming a rail.

The second set of ducts and the third set of ducts are subsequently installed and fixed on the struts 7. The duct support 15 of the first set of ducts is adapted to translationally move on the rails formed by the carriage 26 and the struts 7.

Figure 6:
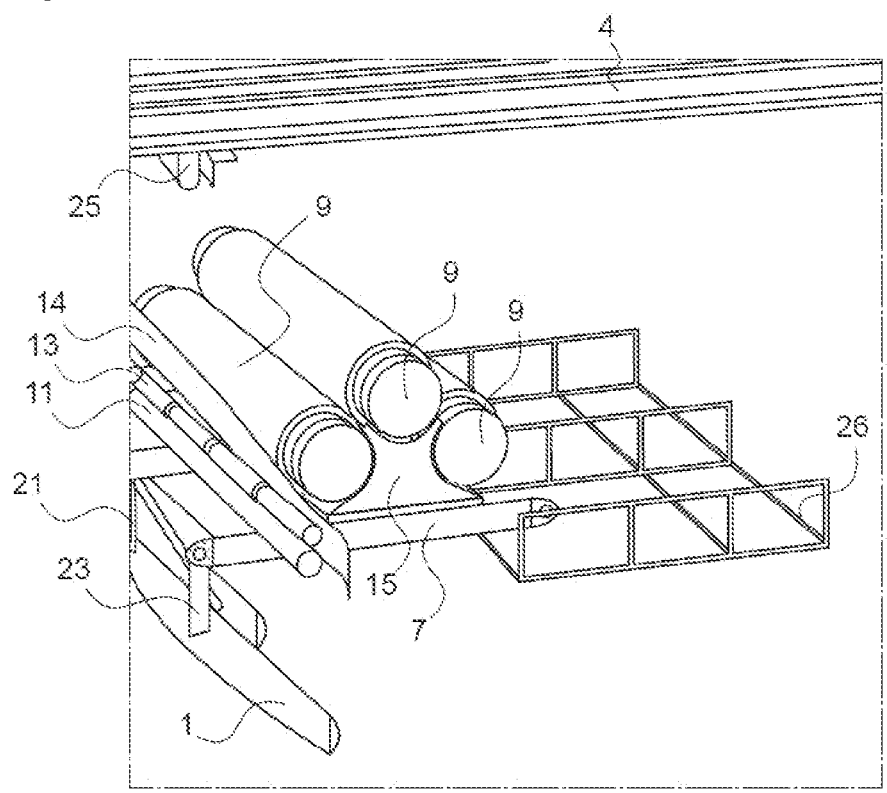
FIG. 6 shows a schematic three-dimensional view of the sets of ducts of FIG. 4 in a second step of installation in an aircraft fuselage portion.

After the translation movement on the struts and after being placed in the desired position thereon, the duct support 15 (and therefore the corresponding set of ducts) is fixed on the struts 7. This configuration is shown in FIG. 6.

In a final step of installing the set of ducts that is shown in FIG. 7, the struts 7 are raised to their vertical nominal position, by pivoting about the pivot 21. The detachable link between the second part 24 and the link part 25 is reformed or, more generally, the strut 7 is detachably fixed close to the floor 4. The triangle area 8 is thus reformed. The sets of ducts, which are secured to the struts 7, are tilted at the same time as the struts and are located in the triangle area 8 after the struts are tilted in the vertical position.

By proceeding thus, the installation of the sets of ducts in the triangle area is greatly facilitated compared to the prior art. The set of ducts or the sets of ducts can be formed outside the aircraft, without any constraints for the assembly operators. With the installation in the triangle area being carried out by installing the tilted struts in a horizontal and fixing position, then tilting the struts, the installation and the fixing does not require any support for the set of ducts during these operations.

Figure 8:
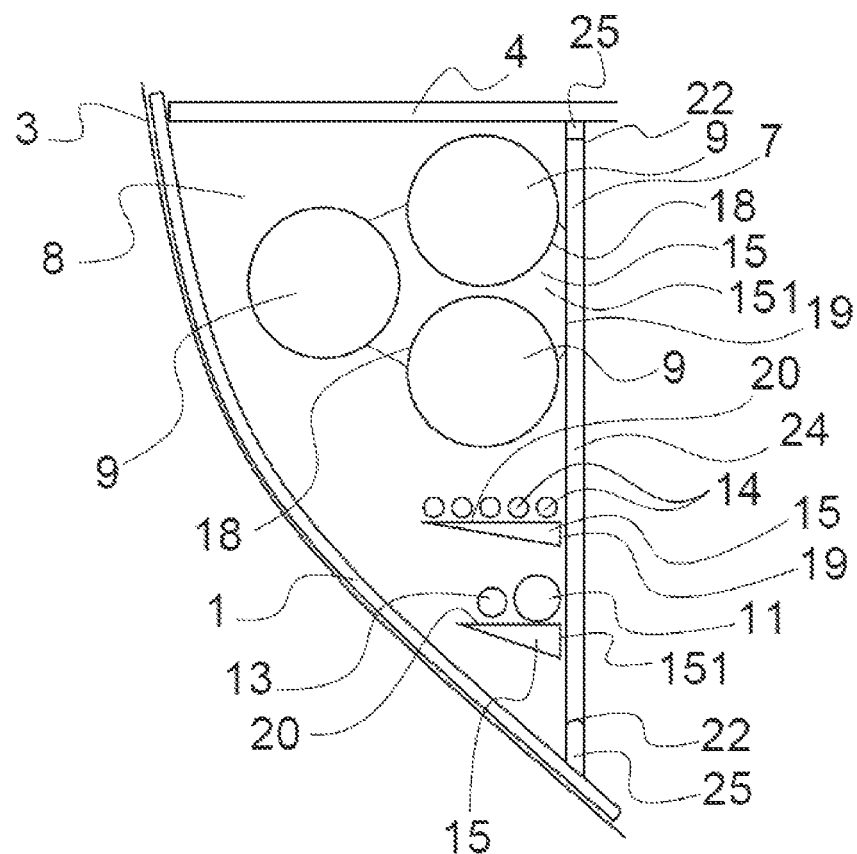
FIG. 8 shows a schematic two-dimensional view similar to that of FIG. 4 of an installation, in a fuselage portion according to one embodiment of the invention, comprising sets of ducts installed in the triangle area of the fuselage portion.

In FIG. 8, as in FIG. 4, the installed ducts correspond to the ducts previously described with reference to FIG. 3. The ducts are consolidated into three sets of ducts identical to those described with reference to FIG. 4.

Each set of ducts comprises, in the example shown, a duct support 15.

The duct support 15 can comprise a rigid element 151 extending in the direction of extension of the ducts or, preferably, can comprise a plurality of duct support elements 16, 17, as in the example shown herein. According to the second embodiment illustrated in FIG. 8, the struts 7 can form or be made up of the duct supports 15.

Thus, all or some of the ducts of the sets of ducts can be directly fixed to a plurality of struts, in order to form a module that is independent, even outside, of the aircraft portion that the ducts are intended to equip.

The rigid elements 151 inserted between the struts and the ducts can be shaped to provide good support for the ducts. In the example shown herein, the rigid elements 151 connected to the first set of ducts have a plurality of surfaces 18 for accommodating circular ducts, with each accommodation surface 18 forming an arc of a circle with a diameter corresponding to that of the duct that it is intended to accommodate.

Each rigid element 151 comprises a flat face 19 adapted to come into abutment and to be fixed on the struts 7 of the duct support.

The rigid element 151 of the second set of ducts, like that of the third set of ducts, is in the form of a support bracket having a face 20 for accommodating the ducts and, like the rigid element 151 of the first set of ducts, a flat face 19 adapted to come into abutment and to be fixed on a strut 7.

The fuselage portion shown in FIG. 8 comprises a triangle area 8, defined in a similar manner to that described in the preceding figures.

The fuselage portion of FIG. 8, in accordance with a second embodiment of the invention, has the particular feature that each strut 7 comprises, at a first end located close to a frame 1, as well as at a second end located close to the floor 4, a detachable link 22. More specifically, in the preferred embodiment shown, each strut 7 is connected, at the first end thereof, to a first link part 25 rigidly connected to a frame 1 of the fuselage structure. Furthermore, each strut 7 is connected, at the second end thereof, to a second link part 25 rigidly connected to the floor 4 of the fuselage structure.

Each detachable link can be similar to the detachable link described with reference to FIG. 4.

Each strut thus can be separated from the fuselage structure. This grants access to the space that will form the triangle area 8 once the struts 7 are in the nominal position in the fuselage portion. This also allows the concomitant positioning of the struts and of the sets of ducts that they support.

Figure 9:
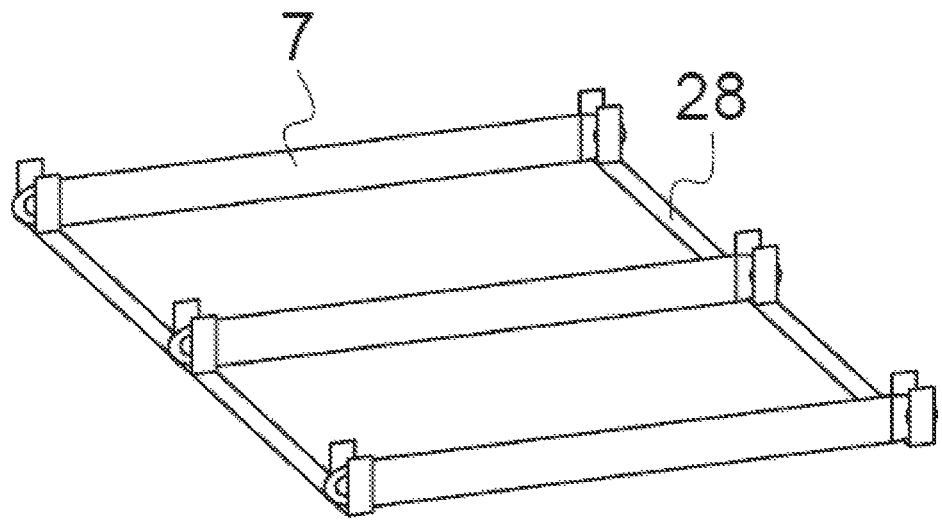
FIG. 9 shows a schematic three-dimensional view of a step prior to the formation of a module comprising the sets of ducts of FIG. 8.
Figure 10:
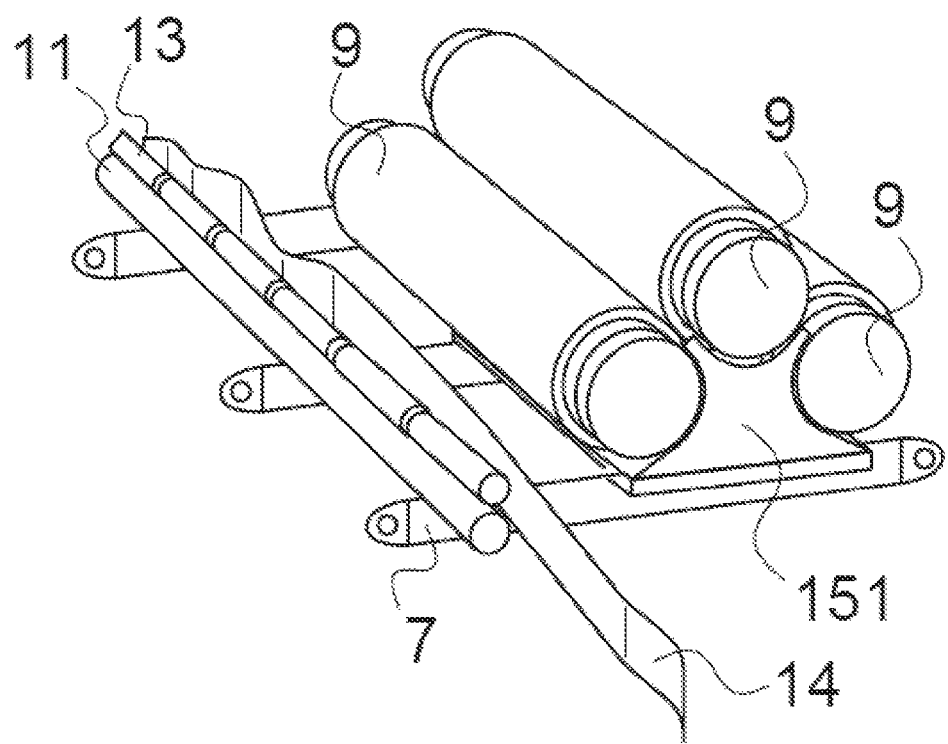
FIG. 10 shows a schematic three-dimensional view of the sets of ducts of FIG. 8 prior to their installation in a fuselage portion.

FIG. 9 shows a step prior to the formation of a module comprising the sets of ducts of FIG. 8 and which is shown in FIG. 10. In particular, FIG. 10 shows the sets of ducts of FIG. 8 prior to their installation in a fuselage portion.

The significant advantage of the invention, whereby the set of ducts (or each set of ducts) can be formed before it is installed in an aircraft fuselage portion (for example, in a workshop independent of the final aircraft assembly workshop), is clearly shown in FIGS. 9 and 10.

The set of ducts or the sets of ducts are formed on a suitable jig. According to the step shown in FIG. 9, the struts 7 forming or participating in the formation of the duct supports used in the considered set or the considered sets of ducts are positioned on the tooling forming the jig 28 in order to form the one or more set or sets.

In particular, the jig 28 determines the desired position, and, in particular, the spacing, of the struts 7. The struts thus form a support skeleton for the sets of ducts that must be installed in the fuselage portion.

As can be seen in FIG. 10, the optional rigid elements 151 are subsequently positioned on the struts 7 and fixed thereto. The ducts 9, 11, 13, 14 are positioned and fixed on the duct support formed by the struts 7 and, if applicable, the rigid elements 151. This assembly can be carried out in an environment where it is easy to carry out, outside the fuselage portion that must be equipped. Any sealing or operating tests are subsequently conducted on the sets of ducts that are thus formed.

The sets of ducts, on their support, are subsequently brought into an aircraft fuselage portion, opposite the area where they must be installed.

The struts 7 are raised to the vertical position and are fixed, at each end thereof, to the fuselage structure, so that the triangle area 8 is formed, and the sets of ducts are directly installed therein when the struts 7 are positioned and fixed.

The installation of the sets of ducts in the triangle area is thus greatly facilitated compared to the prior art. The set of ducts or the sets of ducts can be formed outside the aircraft, without any constraints for the assembly operators. The formation of the triangle area and the concomitant installation of the sets of ducts is easy and rapid.

Furthermore, the developed invention, in all the embodiments thereof, has proven to be particularly advantageous when it is applied to a family of aircraft having, according to the variations of the family, a plurality of lengths. Indeed, this type of family of aircraft can be made up of a basic fuselage portion, for which the set of ducts can be standardized, and optionally of an additional fuselage portion. Thus, the design of a set of ducts for the basic fuselage portion, which will be used for all the aircraft of the family, and the design of a set of ducts for the additional fuselage portion (or, if applicable, of a set of ducts for each of the additional fuselage portions contemplated in the family), are sufficient for covering all the aircraft of the family.

The invention that is thus developed greatly simplifies the operations for assembling ducts in the aircraft, in particular ducts installed in the under floor triangle area, whether this involves pneumatic, hydraulic or electric ducts.

The use of struts that are detachable or that can pivot under the floor in effect grants access to the area for installing the ducts. It also allows, if applicable, one or more sets of ducts to be formed that are assembled outside the fuselage portion that they are intended to equip.

Each set of ducts can be easily mounted and/or can be mounted without any constraints for the assembly operators and it can be tested before it is installed in the fuselage portion. Forming the ducts as a single set, or as a limited number of sets of ducts, allows the number of connectors to be formed to be limited, which improves the reliability of the ducts.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft fuselage portion extending in a longitudinal direction, and comprising:
   a fuselage structure comprising annular frames and a flat floor,
   struts, which extend, in a nominal position perpendicular to the floor, from the floor to a frame, each strut comprising a first end located close to the frame and a second end located close to the floor,
      each strut comprising, at the second end, a detachable link so that the strut can be moved relative to the fuselage structure or separated from the fuselage structure from the nominal position of the strut perpendicular to the floor to temporarily grant access to a triangle area space located between the frames,
      wherein each strut comprises a pivot at the first end, so that the strut is tiltable from its nominal position to a position in a plane perpendicular to said longitudinal direction when the detachable link is released,
   a duct support spanning at least a pair of adjacent struts, wherein the duct support is adapted to translationally move on rails formed by the pair of adjacent struts when the pair of struts is titled from the nominal position, and wherein the duct support is fixed to the pair of struts when the pair of struts is in the nominal position.

2. The fuselage portion according to claim 1, wherein each strut is connected, at the first end thereof, to a first part rigidly connected to the frame.

3. The fuselage portion according to claim 1, wherein the second end of each strut is connected, by the detachable link, to a link part connected to the fuselage structure and comprising a first orifice, the strut comprising a second orifice aligned with the first orifice, with a detachable rigid link element, being placed in said first and second orifices to form said detachable link.

4. The fuselage portion according to claim 3, wherein the detachable rigid link element comprises a pin, a bolt, or a stud.

5. The fuselage portion according claim 1, further comprising at least one set of ducts extending in the longitudinal direction, said set being installed in the triangle area space, each duct being of an electric, hydraulic or pneumatic type.

6. The fuselage portion according to claim 5, wherein the set of ducts comprises at least two ducts, and wherein the set of ducts is supported by the duct support, each duct being connected to said duct support.

7. The fuselage portion according to claim 6, wherein the duct support of the set of ducts comprises a plurality of duct support elements distributed in said longitudinal direction following a spacing of the struts in said longitudinal direction.

8. An aircraft fuselage portion extending in a longitudinal direction, and comprising:
   a fuselage structure comprising annular frames and a flat floor,
   struts, which extend, in a nominal position perpendicular to the floor, from the floor to a frame, each strut comprising a first end located close to the frame and a second end located close to the floor,
      each strut comprising, at the second end, a detachable link so that the strut can be moved relative to the fuselage structure or separated from the fuselage structure from the nominal position of the strut perpendicular to the floor to temporarily grant access to a triangle area space located between the frames,
   wherein each strut comprises a pivot at the first end, so that the strut is tiltable from its nominal position to a position in a plane perpendicular to said longitudinal direction when the detachable link is released,
   at least one set of ducts extending in the longitudinal direction, said set being installed in the triangle area space, each duct being of an electric, hydraulic or pneumatic type,
   wherein the set of ducts comprises at least two ducts, and wherein the set of ducts comprises a duct support, each duct being connected to said duct support,
   wherein the duct support is fixed to a plurality of the struts of the fuselage portion,
   wherein the duct support of the set of ducts comprises a plurality of duct support elements distributed in said longitudinal direction following a spacing of the struts in said longitudinal direction,
   wherein the duct support for the set of ducts comprises means adapted to translationally move on rails formed by the struts.

9. The aircraft fuselage portion according to claim 5, wherein the set of ducts comprises at least two ducts from among:

an air distribution duct for distributing air in a cabin and/or a cockpit;

a hydraulic duct for a hydraulic control system;

a water duct;

a suction duct.

10. An aircraft comprising at least one fuselage portion according to claim 1.

11. A method for assembling an aircraft fuselage portion according to claim 5, comprising the following steps:

supplying a fuselage portion extending in a longitudinal direction, and comprising:

a fuselage structure comprising annular frames and a flat floor, struts, which extend, in a nominal position perpendicular to the floor, from the floor to a frame, each strut comprising a first end located close to the frame and a second end located close to the floor, each strut comprising, at the second end, a detachable link so that the strut can be moved relative to the fuselage structure or separated from the fuselage structure to temporarily grant access to a triangle area space located between the frames, the floor and said struts in said nominal position, wherein each strut comprises a pivot at the first end thereof, so that the strut is tiltable from its nominal position to a position in a plane perpendicular to said longitudinal direction when the detachable link is released, said struts being in a position granting access to the triangle area space;

forming a set of ducts comprising at least two ducts and a duct support, with each duct being connected to said duct support, said duct support being connected to, or at least partly formed by, a plurality of struts of the fuselage portion;

positioning each strut in the nominal position thereof and immobilizing the struts in this position.

* * * * *